United States Patent [19]

Sanner

[11] Patent Number: 4,874,933
[45] Date of Patent: Oct. 17, 1989

[54] AMBIENT ILLUMINATION BAR CODE READER

[75] Inventor: Medford D. Sanner, Irving, Tex.

[73] Assignee: Recognition Equipment Incorporated, Dallas, Tex.

[21] Appl. No.: 88,397

[22] Filed: Aug. 21, 1987

[51] Int. Cl.[4] .............................................. G06K 7/10
[52] U.S. Cl. .................................... 235/470; 235/454; 235/462
[58] Field of Search ............... 235/435, 454, 460, 462, 235/463, 470

[56] References Cited

U.S. PATENT DOCUMENTS

| | | | |
|---|---|---|---|
| 4,074,115 | 2/1978 | Sugiura et al. | 235/462 |
| 4,096,992 | 6/1978 | Nojiri et al. | 235/462 |
| 4,114,030 | 9/1978 | Nojiri et al. | 235/464 |
| 4,135,663 | 1/1979 | Nojiri et al. | 235/463 |
| 4,136,821 | 1/1979 | Sagiura et al. | 235/462 |
| 4,140,271 | 2/1979 | Nojiri et al. | 235/440 |
| 4,147,295 | 4/1979 | Nojiri et al. | 235/463 |
| 4,210,802 | 7/1980 | Sakai | 235/483 |
| 4,290,688 | 9/1981 | Call | 346/107 R |
| 4,335,303 | 6/1982 | Call | 346/107 R |
| 4,408,120 | 10/1983 | Hara et al. | 235/462 |
| 4,488,678 | 12/1984 | Hara et al. | 235/463 |
| 4,516,017 | 5/1985 | Hara et al. | 235/472 |
| 4,528,444 | 7/1985 | Hara et al. | 235/462 |
| 4,538,060 | 8/1985 | Sakai et al. | 235/472 |
| 4,621,292 | 11/1986 | Hirao et al. | 358/227 |
| 4,766,299 | 8/1988 | Tierney et al. | 235/462 |
| 4,816,659 | 3/1989 | Bianco et al. | 235/462 |
| 4,818,856 | 4/1989 | Matsushima et al. | 235/462 |

FOREIGN PATENT DOCUMENTS 0193762 9/1986 European Pat. Off. .
2109600 6/1983 United Kingdom .

Primary Examiner—Jeffrey A. Gaffin
Attorney, Agent, or Firm—Ross, Howison, Clapp & Korn

[57] ABSTRACT

A bar code scanner (10) for scanning bar codes (12) is provided. The bar code scanner (10) includes an image sensor (26) for converting optical information into an electrical signal. The bar codes (12) are illuminated by ambient light only and not by a light source associated with the bar code scanner (10). Circuitry (38) is provided for driving the image sensor (26). Circuitry (80-88) is provided for producing an electrical signal indicative of the bar code information.

11 Claims, 1 Drawing Sheet

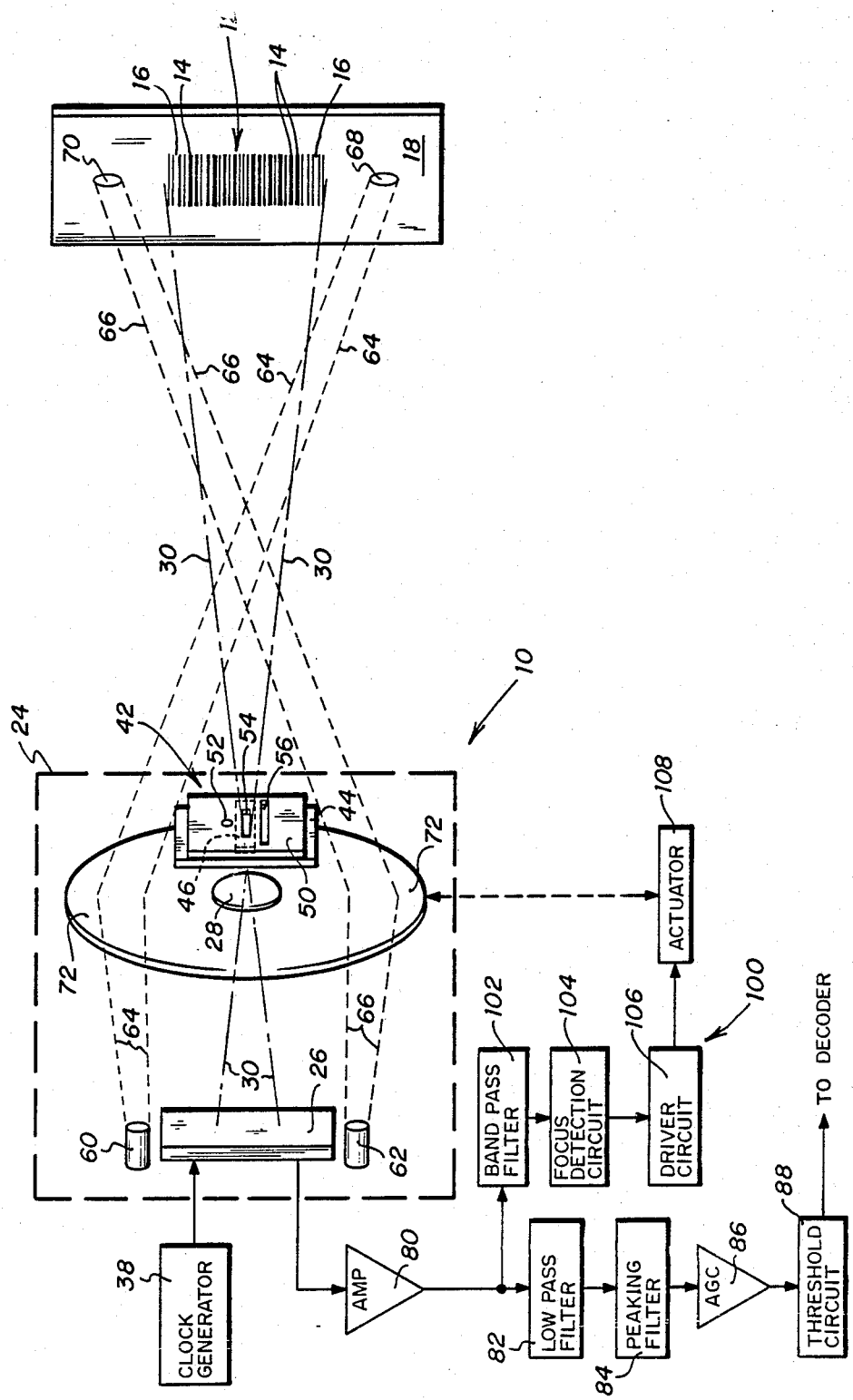

AMBIENT ILLUMINATION BAR CODE READER

TECHNICAL FIELD

This invention relates to optical bar code readers, and more particularly to a self-scanning bar code reader utilizing ambient light as the sole bar code illumination source.

BACKGROUND OF THE INVENTION

Information recognition systems are well known in the art. Extensive use of bar code symbols for encoding various items has gained widespread acceptance. Bar code readers detect the information of the bar code from the difference in reflection between dark bars and light spaces or white bars. In a typical bar code reader configuration, an illumination light is supplied to a bar code and is reflected by the bar code according to the dark and light bars. The reflected light is converged and received by a lens and a light responsive image sensor. Since the reflected light has a light density corresponding to the light reflectivity of the bar code, the bar code is converted by the image sensor into an image signal which has a signal level corresponding to the density of the reflected light. This image signal is then processed electronically for recognizing the bar code symbol.

Since bar code readers detect the information of the bar code from the difference in reflection between dark and light bars, the amplitude of the output signal from the reading sensor is small when the reflection factor is low and when reading a bar code printed on a high reflection factor label, the output signal exhibits a large amplitude. Therefore, the output signal level changes due to the difference in reflection factor of the bar code labels. The reflection factor is influenced by the amount of light impinging upon the bar code. Problems encountered with bar code readers using illumination light sources include a nonuniform illumination of the bar codes, an illumination level that varies with the distance between the bar codes and the reader and an illumination level that varies with the angular orientation of the reader to the bar codes. The use of an illumination source having an increased intensity lessens some of these problems. However, increased light intensity results in an increase in the space occupied by a light source, increased power consumption and increased heat generation. Additionally, the intensity of the reflected light changes when the intensity of the incident light changes. Since external light is also incident on the label, the intensity of the reflected light is affected even if the intensity of the light from a built-in light source is kept constant.

A need has thus arisen for a bar code reader which utilizes a charge transfer device image sensor which eliminates the problems associated with a built-in illumination light source by solely utilizing ambient light as the bar code illumination source. The use of ambient light uniformly illuminates the bar codes and renders the intensity of the reflected light independent of the separation between the bar code reader and bar codes. Ambient light as an illumination source also renders the bar code reader less sensitive to the angular position of the reader to the bar code, such that the intensity of the reflected signal is independent of the angular position. The use of ambient light further allows for a large range of light intensity which must be accommodated by a charge transfer device image sensor. Such a bar code reader must have a large depth of field while being capable of reading a full range of bar code densities.

SUMMARY OF THE INVENTION

The present bar code reader is utilized in a system for scanning bar codes having a plurality of parallel bar symbols recorded in contrastive light reflecting properties for converting optically readable information into an electrical signal. The bar code scanner of the present invention includes an image sensor for converting optical information into an electrical signal. The image sensor includes a plurality of optical imaging elements arranged in a linear array which are activated to produce an output signal by reflected light received from the plurality of parallel bar symbols. The plurality of parallel bar symbols are illuminated by ambient light only and not by a light source associated with the bar code scanner. The image sensor is driven such that the image sensor performs electronic scanning of the bar code symbols. A processor is responsive to the output signal generated by the image sensor for producing an electrical signal indicative of the read information.

BRIEF DESCRIPTION OF THE DRAWING

For a more complete understanding of the present invention and for further advantages thereof, reference is now made to the following Detailed Description taken in conjunction with the accompanying Drawing which is a schematic block diagram of the present bar code reader.

DETAILED DESCRIPTION

Referring to the FIGURE, the present bar code reader is pictorially illustrated, and is generally identified by the numeral 10. Bar code reader 10 and an associated decoder converts bar code information into electrical signals indicative of numerals, letters or the like. Bar code reader 10 is utilized for reading bar codes generally identified by the numeral 12 which are composed of black bars or dark bars 14 and white bars or light spaces 16 interdisposed between black bars 14. Bar codes 12 are positioned parallel to each other and are disposed on a label 18. Bars 14 may be printed in any color so as to be contrastive with the light spaces 16 which may be any color contrastive to bars 14.

Bar code reader 10 includes a housing generally identified by the numeral 24. Disposed within housing 24 is an image sensor 26 which receives reflected light from bar codes 12 through an image lens 28. Image sensor 26 comprises a one-dimensional or linear image array including a plurality of optical imaging elements which convert the image of bar code 12 into an electrical signal by an electronic scanning operation. A dot-dash line 30 indicates the locus of light reflected from bar codes 12 that impinges upon image sensor 26. Necessary clock pulses for driving image sensor 26 are produced by a clock generator 38. Image sensor 26 may comprise, for example, a charge-coupled device, such as a model TCD131D manufactured and sold by Toshiba Corporation and having 2048 picture elements. An important aspect of the present invention is that image sensor 26 operates based upon reflections from bar codes 12 utilizing only ambient light as there are no bar code illumination sources contained within housing 24. The use of ambient light as an illumination source for bar codes 12 in combination with the additional circuitry to be subsequently described, allows bar code reader 10 to read both high and medium resolution bar codes with a large depth of field with lower power dissipation. The present bar code reader 10 has a large dynamic range and by using ambient light as the sole illumination source, there is little difference in the illumination levels on bar codes 12 regardless of whether housing 24 is positioned relatively close or far from label 18.

To compensate for the amount of ambient light present in the environment in which the present bar code reader 10 is utilized, the present bar code reader 10 further includes an aperture assembly generally identified by the numeral 42. Aperture assembly 42 is disposed within housing 24 adjacent image lens 28 and functions to control the amount of reflected light which impinges upon image sensor 26 from bar codes 12. Aperture assembly 42 includes a diaphragm 44 having a slotted aperture 46. The longitudinal axis of slotted aperture 46 is positioned in a direction perpendicular to the longitudinal axis of the linear array of optical imaging elements contained within image sensor 26. Disposed adjacent to diaphragm 44 is a sliding aperture plate 50. Sliding aperture plate 50 includes a circular aperture 52, a slotted aperture 54 and a slotted aperture 56. Slotted aperture 54 is shorter in its longitudinal axis than slotted aperture 56. Sliding aperture plate 50 is selectively positionable such that either aperture 52, 54 or 56 can be aligned with slotted aperture 46 of diaphragm 44 to thereby control the amount of reflected illumination passing through image lens 28 to image sensor 26. In those instances where bar code reader 10 is utilized with a low ambient light level such as, for example, in a warehouse environment, slotted aperture 56 would be disposed adjacent slotted aperture 46 of diaphragm 44. In a high ambient light environment, circular aperture 52 would be aligned with slotted aperture 46 of diaphragm 44.

In order to assist the user of bar code reader 10 in pointing bar code reader 10 in the direction of label 18 and so that bar codes 12 are aligned with image sensor 26 within housing 24, bar code reader 10 includes illumination sources 60 and 62. Illumination source 60 and 62 generate a locus of light indicated by dotted lines 64 and 66, respectively, which generate illumination spots 68 and 70, respectively, on label 18 adjacent the ends of bar codes 12. Illumination spots 68 and 70 function as alignment guides for the user of bar code reader 10. Focusing for illumination spots 68 and 70 is provided by a Fresnel lens 72 which is positioned adjacent image lens 28 within housing 24. The locus of light generated by illumination sources 60 and 62 does not impinge upon bar codes 12 and therefore illumination sources 60 and 62 do not function as an illumination source for bar codes 12. Illumination sources 60 and 62 may comprise, for example, light emitting diodes.

Image sensor 26 performs electronic scanning upon receipt of clock pulses from clock generator 38 so that the bars 14 and 16 imaged on the linear array of optical imaging elements of image sensor 26 are converted into corresponding electrical signals. The clock pulses from clock generator 38 are repeatedly fed to image sensor 26 so that the electronic scanning is repeatedly effected until reading is completed. Each array member of image sensor 26 converts optical information into an electrical signal in such a manner that data in the form of charge stored in each imaging element is read out in synchronism with the clock from clock generator 38. The output of image sensor 26 is amplified by an analog amplifier 80. The output of image sensor 26 includes the signal representing the image of bar codes 12 as well as undesirable clock noise associated with the clocking signals generated by clock generator 38. Therefore, the output of analog amplifier 80 is applied to a low pass filter 82 which passes the low frequency components from the output signal of image sensor 26 and excludes the noise components introduced into the output signal of image sensor 26 from clock generator 38.

The output of low pass filter 82 is applied to a peaking filter 84 which functions to boost the frequency of the output signal from image sensor 26 above a predetermined frequency. Peaking filter 84 functions to improve the modulation of the image of bar codes 12 for thin bars as the distance between bar code reader 10 and label 18 increases. Peaking filter 84 further functions to compensate for blurred images and a loss of modulation of images impinging upon image sensor 26.

The output of peaking filter 84 is applied to an automatic gain control amplifier 86 which functions to control the changes in the output signals of image sensor 26 based upon variations in the amount of ambient illumination light impinging on bar codes 12. Amplifier 86 functions to produce a normalized output of the analog signals generated by image sensor 26. The output of amplifier 86 is applied to a threshold circuit 88 which functions to generate a digital pulse corresponding to the transitions of the analog output signal of image sensor 26 which corresponds to the transitions between bars 14 and 16 of bar codes 12. The output of threshold circuit 88 represents a digital pulse corresponding to the width of bars 14 and 16. The output of threshold circuit 88 is applied to a decoder for generating a particular character associated with bar codes 12. The decoder may comprise, for example, a Model 1986 manufactured and sold by Recognition Equipment Incorporated of Dallas, Tex.

Bar code reader 10 also includes an automatic focusing system generally identified by the numeral 100 for varying the position of image lens 28 and Fresnel lens 72 within housing 24 based upon the intensity of the output of image sensor 26. The output of analog amplifier 80 is applied to a band pass filter 102 whose output is applied to a focus detection circuit 104. Band pass filter 102 functions to pass bar code modulation associated with only high resolution bars while excluding clock noise and low frequency modulation associated with wide bars to thereby extract high spacial frequencies associated with high resolution bar codes which require focus correction. Focus detection circuit 104 functions to detect the focus position of image lens 28 in response to the amplitude of the high frequency signal of the image signal generated by image sensor 26. Focus detection circuit 104 provides a deviation signal while the focus position of image lens 28 is detected to be deviated from the appropriate position to bring high frequency bar codes into focus. A driver circuit 106 is connected to receive the deviation signal from focus detector circuit 104 and is coupled to an actuator 108 to control the position of image lens 28. The operation of autofocus system 100 is further described in U.S. Pat. No. 4,136,821 which disclosure is incorporated herein by reference.

It therefore can be seen that the present bar code reader operates in a wide range of ambient light, and utilizes ambient light as the sole source of illumination for bar code symbols. The dynamic range of the present invention is provided for by utilizing various sized apertures for the imaging lens as well as an automatic gain control amplifier. Depth of field is improved by the use of a peaking filter. The present invention further utilizes spotting illumination sources for generating illuminating spots for assisting the user in the alignment of the bar code reader with a label containing bar codes. The present invention constitutes a noncontact, self-scanning bar code reader with a large depth of field for reading both high and medium resolution bar code symbols.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A bar code scanner for scanning bar codes having a plurality of parallel bar symbols recorded in contrastive light reflecting properties and for converting optically readable information into an electrical signal comprising:

an image sensor having a plurality of optical imaging elements arranged in a linear array and being activated to produce an analog output signal indicative of the width of the bar symbols by reflected light received from the plurality of parallel bar symbols, the plurality of parallel bar symbols being illuminated by ambient light only and not by a light source associated with the bar code scanner;

clock generator means for generating clocking signals at a predetermined frequency and for applying said clocking signals to said image sensor to enable optical reading of the bar symbols;

means for filtering said analog output signal to thereby filter clock noise associated with said clocking signals from said analog output signal and for generating a filtered signal;

means for increasing the amplitude of said filtered signal above a predetermined frequency;

means for automatically controlling the amplitude of said filtered signal and for generating a normalized analog signal; and means for converting said normalized analog signal to a digital signal indicative of the width of the bar symbols.

2. The bar code scanner of claim 1 wherein said image sensor includes a charge-coupled device.

3. The bar code scanner of claim 1 and further including:

a plate disposed between said image sensor and the bar symbols, said plate including an adjustable aperture, said aperture being adjustable between a generally rectangular shaped and a generally circular shaped, said rectangular shaped aperture having a longitudinal axis extending generally perpendicularly to the longitudinal axis of said linear array of optical imaging elements and being adjustable in length along said longitudinal axis.

4. The bar code scanner of claim 1 and further including:

a light source for illuminating areas adjacent the plurality of parallel bar symbols.

5. The bar code scanner of claim 1 and further including:

a lens disposed between said image sensor and the bar symbols for focusing the light reflected from the bar symbols onto said image sensors; and means interconnected to said lens for adjusting the distance between said lens and said image sensor.

6. A bar code scanner for scanning bar codes having a plurality of parallel bar symbols recorded in contrastive light reflecting properties and for converting optically readable information into an electrical signal comprising:

a charge transfer device image sensor having a plurality of optical imaging elements arranged in a linear array and being activated to produce an analog output signal by reflected light received from the plurality of parallel bar symbols, the plurality of parallel bar symbols being illuminated by ambient light only and not by a light source associated with the bar code scanner;

clock generator means for generating clocking signals of a predetermined frequency for driving said image sensor, such that said image sensor performs electronic scanning by deriving signal charges from said optical imaging elements;

low pass filter means for filtering clock noise associated with said clocking signals from said analog output signal and for generating a filtered signal;

filter means for increasing the amplitude of selected frequencies of said filtered signal;

automatic gain control means for controlling the amplitude of said filtered signal and for generating a normalized analog signal; and means for converting said normalized analog signal to a digital signal indicative of the read information.

7. The bar code scanner of claim 6 and further including:

a plate disposed between said image sensor and said bar symbols, said plate including an adjustable aperture, said aperture being adjustable between a generally rectangular shaped and a generally circular shaped, said rectangular shaped aperture having a longitudinal axis extending generally perpendicularly to the longitudinal axis of said linear array of optical imaging elements and being adjustable in length along said longitudinal axis thereof.

8. The bar code scanner of claim 7 and further including:

a light source for illuminating areas adjacent the plurality of parallel bar symbols.

9. The bar code scanner of claim 8 and further including:

a lens disposed between said image sensor and the bar symbols for focusing the light reflected from the bar symbols onto said image sensors; and means interconnected to said lens for adjusting the distance between said lens and said image sensor.

10. The bar code scanner of claim 8 and further including:

a lens disposed between said image sensor and the bar symbols for focusing light generated by said light source onto an area adjacent the plurality of parallel bar symbols.

11. The bar code scanner of claim 7 wherein said image sensor optical imaging elements include charge-coupled devices.

* * * * *